(12) United States Patent
McDougal et al.

(10) Patent No.: US 8,914,882 B2
(45) Date of Patent: Dec. 16, 2014

(54) INTRUSION PREVENTION SYSTEM (IPS) MODE FOR A MALWARE DETECTION SYSTEM

(71) Applicant: Raytheon Company, Waltham, MA (US)

(72) Inventors: Monty D. McDougal, St. Paul, TX (US); Jesse J. Lee, Allen, TX (US); William L. Gilmore, Plano, TX (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 13/667,943

(22) Filed: Nov. 2, 2012

(65) Prior Publication Data

US 2013/0117809 A1      May 9, 2013

Related U.S. Application Data (60) Provisional application No. 61/555,046, filed on Nov. 3, 2011.

(51) Int. Cl.

| | |
|---|---|
| G06F 11/00 | (2006.01) |
| G06F 21/56 | (2013.01) |
| H04L 29/06 | (2006.01) |
| G06F 12/14 | (2006.01) |
| G06F 15/173 | (2006.01) |
| H04L 12/66 | (2006.01) |

(52) U.S. Cl.
CPC .......... *H04L 63/1408* (2013.01); *G06F 21/567* (2013.01); *G06F 2221/2101* (2013.01)
USPC ................... 726/22; 726/23; 726/24; 726/25; 370/352; 709/224

(58) Field of Classification Search
None
See application file for complete search history.

(56) References Cited

U.S. PATENT DOCUMENTS

| | | |
|---|---|---|
| 7,380,277 B2 | 5/2008 | Szor |
| 7,519,994 B2 | 4/2009 | Judge et al. |

(Continued)

FOREIGN PATENT DOCUMENTS

WO    WO-2013/067404 A1    5/2013

OTHER PUBLICATIONS

"International Application Serial No. PCT/US2012/063391, International Search Report maiied Jan. 2, 2013", 2 pgs.

(Continued)

*Primary Examiner* — Dede Zecher
*Assistant Examiner* — Trang Doan
(74) *Attorney, Agent, or Firm* — Schwegman Lundberg & Woessner, P.A.

(57) ABSTRACT

Intrusion prevention system (IPS) mode is provided for a malware detection system. At least one staging server is provided for intercepting an incoming electronic message, making a copy of the intercepted incoming electronic message, and holding the intercepted incoming electronic message until an analysis of the copy of the intercepted incoming electronic message has been completed or until a timeout threshold has been exceeded. A malware detection system is coupled to the at least one staging server. The at least one malware detection system includes at least one decomposition server for receiving the copy of the intercepted incoming electronic message and processing the copy of the intercepted incoming electronic message to detect malware. Multiple mail queues, e.g., incoming, timeout, jail, decomposition, and outgoing, are used to manage message flows and delay messages while malware analysis is performed.

25 Claims, 6 Drawing Sheets

(56) References Cited

U.S. PATENT DOCUMENTS

| | | | |
|---|---|---|---|
| 2004/0215977 A1* | 10/2004 | Goodman et al. | 713/201 |
| 2006/0010495 A1* | 1/2006 | Cohen et al. | 726/24 |
| 2006/0109114 A1* | 5/2006 | Watts et al. | 340/568.1 |
| 2007/0083929 A1* | 4/2007 | Sprosts et al. | 726/22 |
| 2007/0250930 A1 | 10/2007 | Aziz et al. | |
| 2008/0196104 A1* | 8/2008 | Tuvell et al. | 726/24 |
| 2009/0064329 A1* | 3/2009 | Okumura et al. | 726/22 |
| 2009/0157708 A1* | 6/2009 | Bandini et al. | 707/100 |
| 2010/0162337 A1* | 6/2010 | Lee et al. | 725/111 |
| 2010/0217811 A1* | 8/2010 | Kay | 709/206 |
| 2010/0251372 A1* | 9/2010 | Luck et al. | 726/24 |
| 2011/0238855 A1* | 9/2011 | Korsunsky et al. | 709/231 |

OTHER PUBLICATIONS

"International Application Serial No. PCT/US2012/063391, Written Opinion mailed Jan. 2, 2013", 5 pgs.

"International Application Serial No. PCT/US2012/063391, International Preliminary Report on Patentability mailed May 15, 2014", 7 pgs.

* cited by examiner

INTRUSION PREVENTION SYSTEM (IPS) MODE FOR A MALWARE DETECTION SYSTEM

CLAIM OF PRIORITY

This application claims priority under 35 U.S.C. 119(e) to U.S. Provisional Patent Application Ser. No. 61/555,046, filed Nov. 3, 2011, which is incorporated herein by reference in its entirety.

BACKGROUND

Traditional network and client based security tools, such as signature-based anti-virus, spam gateways, and firewalls, fail to adequately address sophisticated, socially engineered, and targeted malware attacks. Zero day exploits, obfuscated, and polymorphic malcode are often bundled in well-crafted emails, documents, and websites designed to appear legitimate. Once opened, the malicious code exploits a vulnerability in the targets operating system or applications opening a back channel into the private network.

As a result, these kinds of attacks have proven very effective in eroding the security perimeter of many high-value networks, such as those within the government, defense contractors, the banking industry, and others. With the average user receiving hundreds of emails per day, large organizations need a solution which can meet the performance demands and unique configuration of their environment.

Intrusion prevention systems (IPS), also known as intrusion detection and prevention systems (IDPS), are network security appliances that monitor network and/or system activities for malicious activity. The main functions of intrusion prevention systems are to identify malicious activity and attempt to block and/or stop the malicious activity. Intrusion prevention systems monitor network traffic and/or system activities for malicious activity. Intrusion prevention systems are placed in-line and are able to actively prevent and/or block intrusions that are detected.

Cyber criminals are now actually employing "best practices" like email content personalization and brand impersonation. This means they include public information to make the email very compelling so that nearly anyone would open the attachment or click on the link. As a result, it is becoming more difficult to tell legitimate emails from those seeking to infect systems and steal personal and corporate data. Today, mail transfer agents (MTA), anti-virus vendors, etc. are either performing minimally invasive analysis such that they can release email quickly or are working off a copy of the message in non-real-time.

To effectively prevent all intrusions, the interruption of email delivery is necessary. However, no prior attempts have been made that specifically delay messages as part of a malware detection system in an IPS mode.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Embodiments described here use multiple mail queues, e.g., incoming, timeout, jail, decomposition, and outgoing, to manage message flows and delay messages. Messages are automatically split into the decomposition and timeout queue on ingest. Messages are moved to the jail queue or deliver queue based on analysis by the malware detection system. Delayed responses from the malware detection system will invoke automatic release from the timeout queue. The various states are all managed via scripts, web-based command and control ($C^2$) or secure shell (SSH) based $C^2$.

The malware detection system provides several aspects for IPS mode functionality. The keys involve the use of multiple queues to manage mail deliveries allowing significant pauses and/or delay of mail messages. Emails are automatically released via timeout queues. The automatic overriding of the release of emails may be managed via Malware detection system detection events. Further, dual methods of $C^2$ and the diversity of the commands and functions are also provided. Fail safes in the process release the messages in the event detection is unable to be performed. If automated detection finds malware, the failsafe can be overridden to allow non-real time analysis by an analyst. Mail messages destined for end-users are thus delayed in order to performed advanced and time consuming malware analysis.

Figure 1:
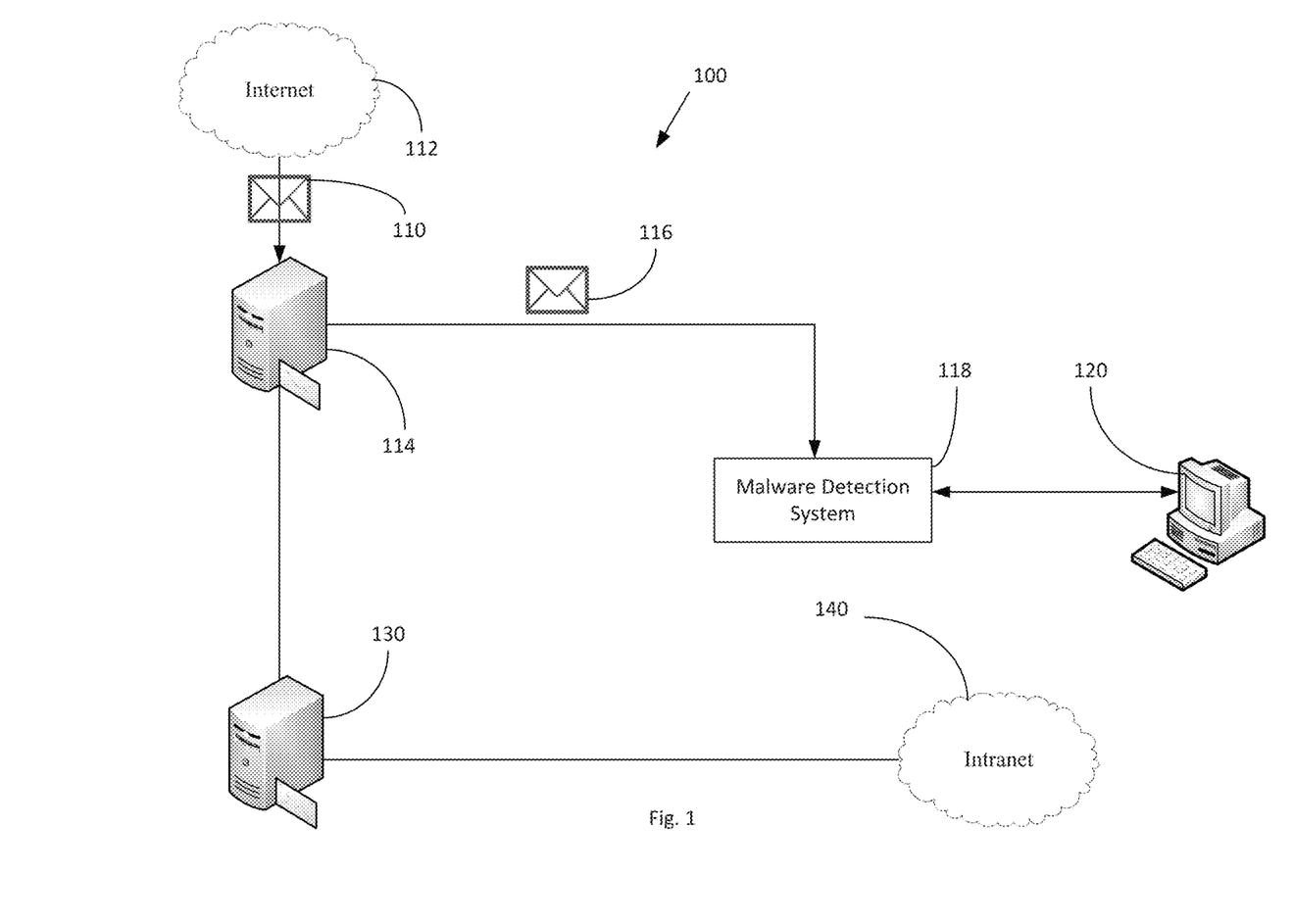
FIG. 1 illustrates a method for processing inbound E-mail messages from the Internet.

FIG. 1 illustrates a method 100 for processing inbound E-mail messages from the Internet. In FIG. 1, email messages 110 are received via a network 112 by a first server 114. After spam, content and anti-virus (A/V) filtering, a blind carbon copy (BCC) header is added to the message. A copy of the email message 116 may be delivered to a malware detection system 118 for processing. If the message is deemed to be suspicious by the malware detection system 118, security analyst may be sent a message to alert the security analyst 120 to the suspicious messages. However, the malware detection system 118 in FIG. 1 only processes a copy of the incoming message. The original message 110 is delivered untouched to the a second server 130, i.e., the mail deliver server, where the untouched email message 110 is forwarded to the recipient, for example, through an organization's intranet 140.

Figure 2:
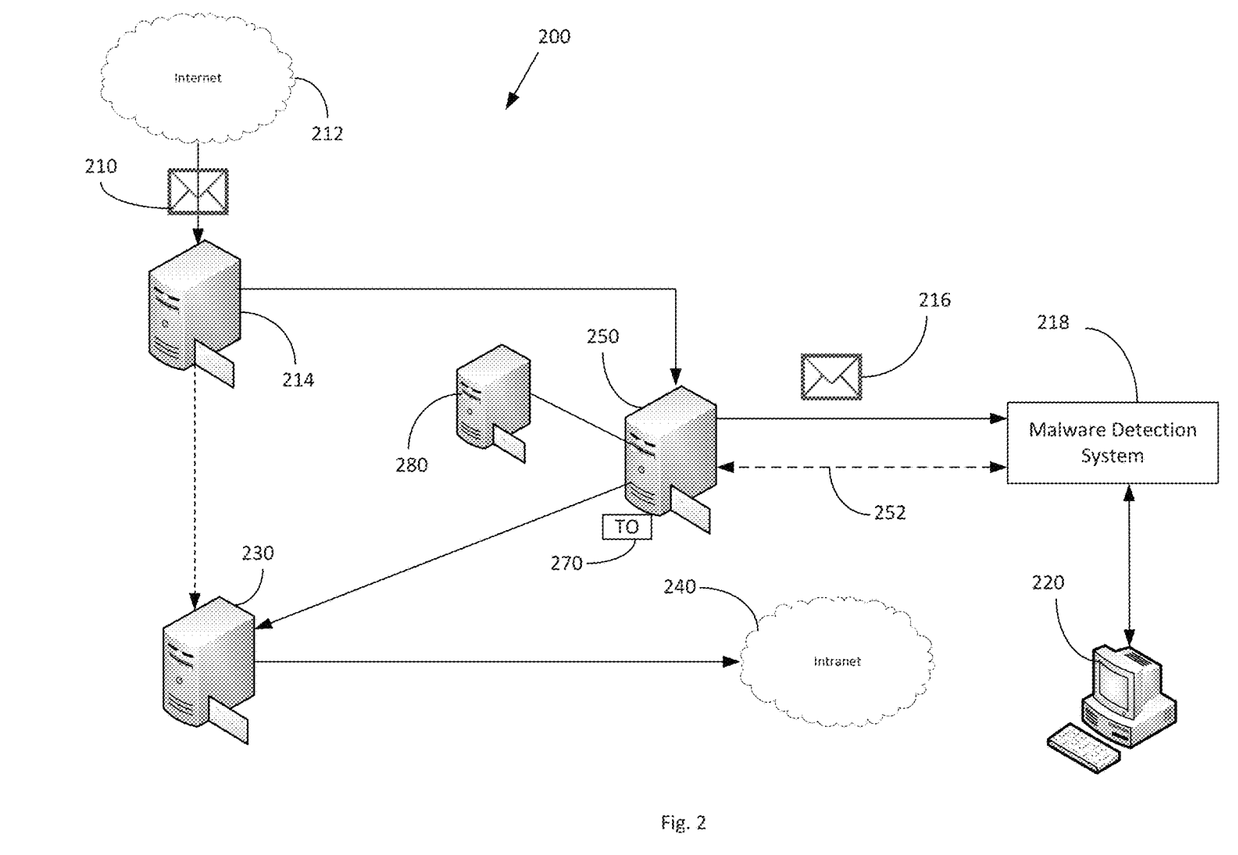
FIG. 2 illustrates a malware detection system according to an embodiment.

FIG. 2 illustrates a malware detection system 200 according to an embodiment. In FIG. 2, email messages 210 are received via a network 212 by a first server 214. After spam and content filtering, messages are delivered to a second server 250, i.e., the staging mail transfer agent (MTA) server. A copy of the message 216 is sent to the malware detection system 218 for analysis. If the message is deemed to be suspicious, an alert may be sent to a security analyst 220. If the message is deemed to be non-suspicious, the malware detection system 218 communicates the non-suspicious message to the staging MTA server 250 through the command and control channel 252. The staging MTA server 250 then forwards the non-suspicious message to a third server 230, i.e., an A/V server. After A/V filtering, the message may then be delivered to the recipient, for example, through an organization's intranet 240. In case of a failure of the staging MTA server 250 and/or the malware detection system 218, a fail open mode 260 is implemented allowing email to be routed from the first server to the third without delay.

The staging MTA server 250 collects only metadata for messages without attachments. For messages with attachments, metadata collection is performed and the attachment is processed by appropriate detection agents. The staging MTA server 250 also includes a timeout mechanism 270. A timeout occurs when the malware detection system 218 is unavailable for a predefined period or does not return malware analysis results within the predefined period. The staging MTA server 250 and the malware detection system 218 are bypassed when a timeout occurs and mail is delivered directly to the third server 230. If the local staging MTA is unresponsive, mail may be routed to a remote MTA. There may be multiple mail exchanger (MX) records to specify mail servers responsible for accepting email messages on behalf of a recipient's domain.

The processing time for the malware detection system is over a predefined threshold. The malware detection system will signal the release messages from the queue. Message without attachments are released once metadata collection is complete. Message with attachments are released once final disposition is determined. Suspicious messages will be quarantined. Quarantine servers 280 may be used for suspicious messages.

Embodiments described herein provide an N-to-M system, wherein there are N staging servers 250 that communicate with M decomposition servers 290, for example at the malware detection system 218. However, a one-to-one staging server-to-decomposition server implementation is not precluded.

Figure 3:
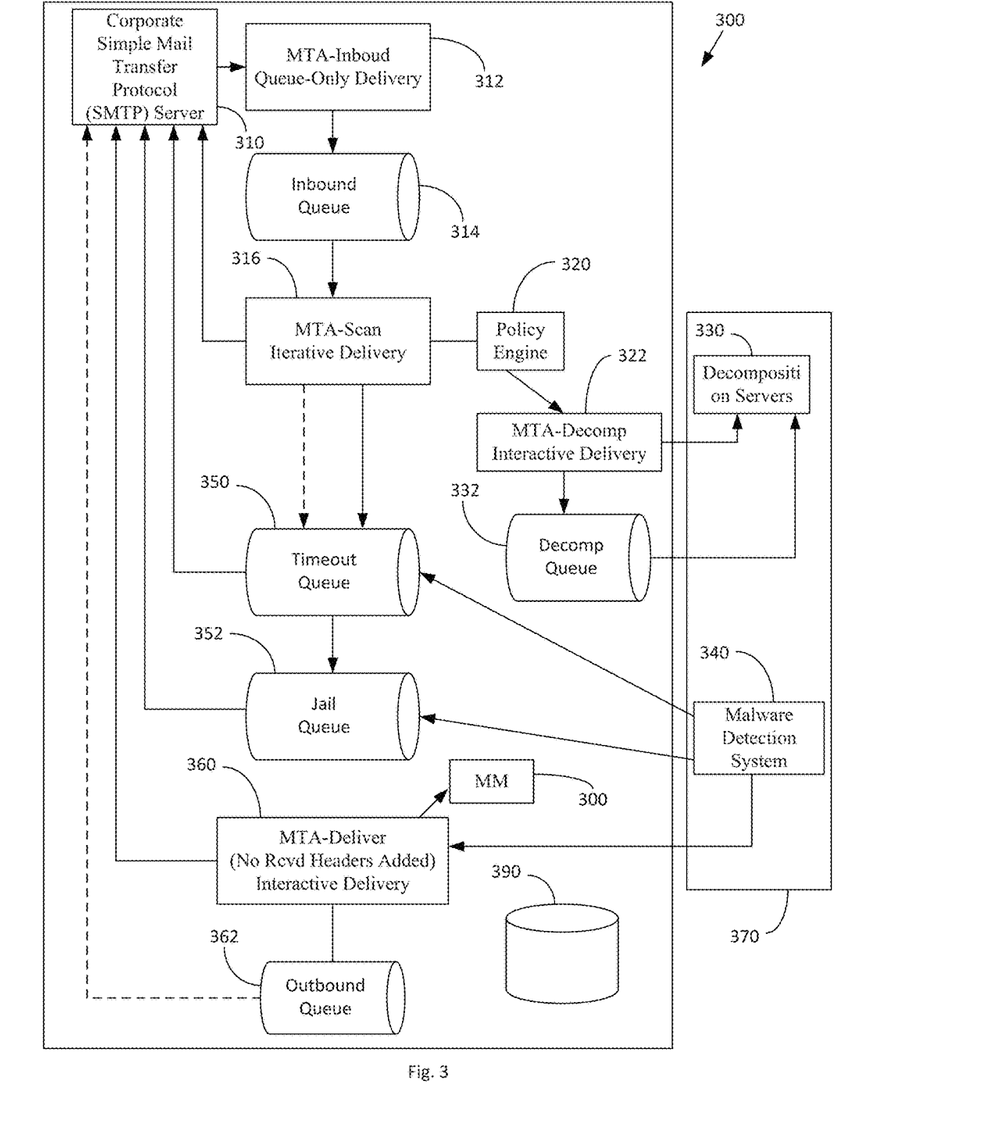
FIG. 3 illustrates a staging server according to an embodiment.

FIG. 3 illustrates a staging server 300 according to an embodiment. In FIG. 3, a corporate SMTP server 310 provides messages to the MTA-inbound queue only delivery module 312. The MTA-inbound queue only delivery module 312 delivers the message to the inbound queue 314. The inbound queue 314 forwards the queued message to the MTA-Scan iterative delivery module 316. The MTA-Scan iterative delivery module 316 provides the message to the message policy engine 320. The message policy engine 320 may perform several actions. For example, the message policy engine may clone the message, apply actions to the copy, store the from information as an X-header, clone queue write time as an X-header, replace the from information with a new address, replace the recipient information with a new address, store the host name as an X-header, store the queue identifiers (QID) as X-headers, etc.

The message policy engine 320 provides the message to the MTA-decomposition interactive delivery module 322. The MTA-decomposition interactive delivery module 322 may forward the message to the decomposition servers 330 or may provide the message to a decomposition queue 332, where the decomposition queue 332 provides the message to the decomposition server 330 when the decomposition server 330 is ready.

Figure 4:
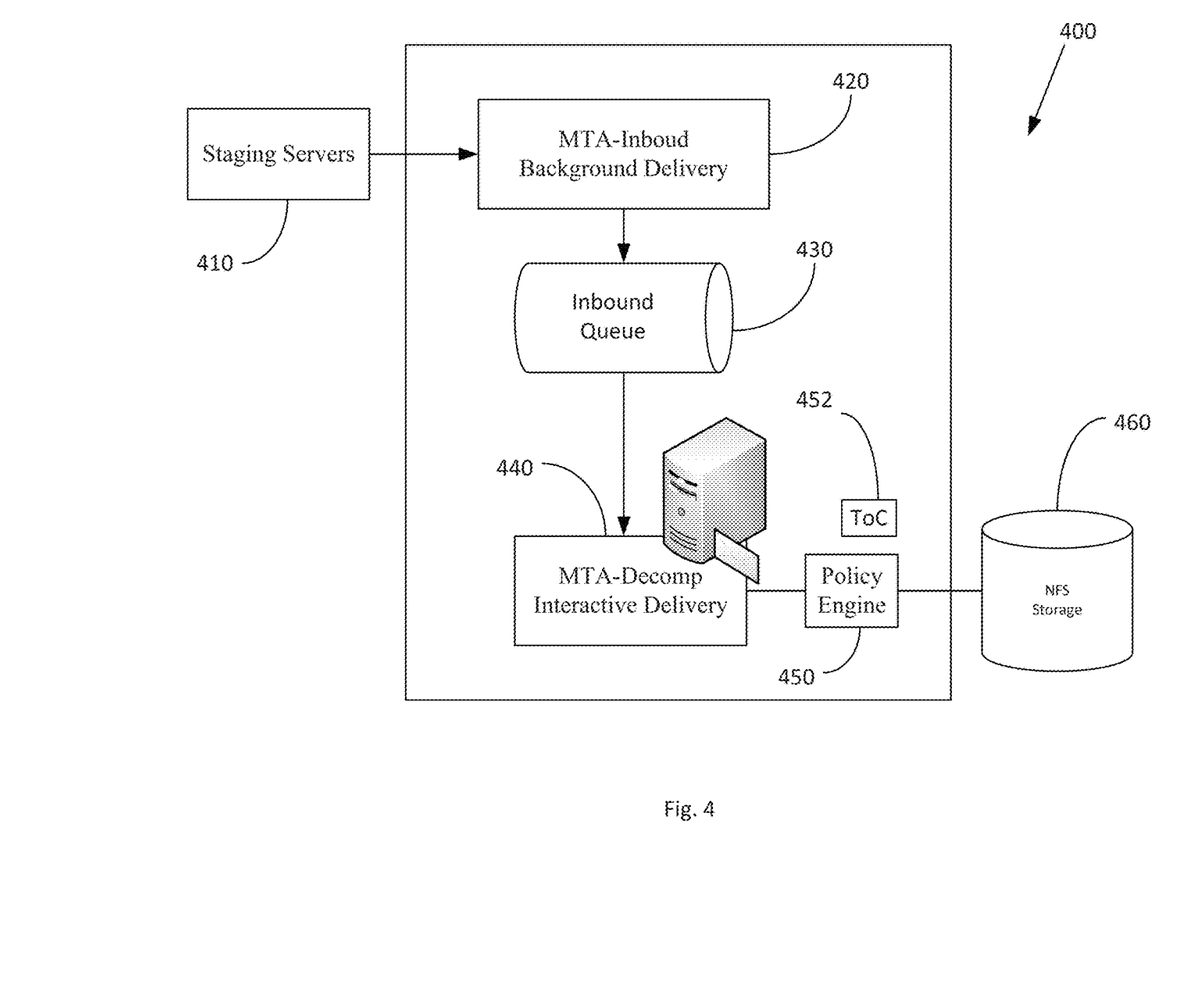
FIG. 4 illustrates the mail processing by the decomposition server according to an embodiment.

FIG. 4 illustrates the mail processing by the decomposition server 400 according to an embodiment. In FIG. 4, the staging server 410 provides messages to the decomposition server 400 through an MTA-inbound background delivery module 420. The MTA-inbound background delivery module 420 provides the message to the inbound queue 430. The inbound queue 430 provides the message to the MTA-decomposition interactive delivery server 440. A message policy engine 450 receives the message from the MTA-decomposition interactive delivery server 440. The message policy server 450 may perform a plurality of actions. The message may be extracted to disk, e.g., NFS storage 460, decomposed into individual pieces. The message policy server may also create a table of contents (TOC) file 452 with the original meta-information. The TOC file 452 may include the original envelope information extracted from the headers. The original message, with malware detection system headers, may be written, e.g., in eml format. The staging server 410 is signaled to discard the message after decomposition is completed.

The TOC file 452 may further include envelope from information, envelope recipient information, identification of the staging server 410 according to an IP address or hostname, identification of the current mode, the staging server host name/IP, the Queue ID on the staging server 410, the time a message is received from or at the staging server 410, and disk space monitoring information. For each attachment, the actual file type may be written, as determined by deep inspection, and the file hash, as determined by inspection by the message policy engine 450, may be written.

Referring again to FIG. 3, the modes of operation will be described. The modes of operation include IPS, IDS inline, IDS Clone, and OFF modes of operation. The functions provided include automated monitoring for failure states, with appropriate actions to ensure prompt mail delivery; remote procedure calls for command and control ($C^2$) management of the operation of the staging server 300; internal mail queues of the staging server 300. As will be shown in FIG. 4, calls may also be provided for the internal mail queues of the decomposition server.

The staging MTA server 300 supports the following modes controlled by $C^2$ from the malware detection system 340 for detecting and analyzing unauthorized intrusions of electronic systems. In IPS mode, the malware detection system 340 controls what is relayed to the original recipients. Original messages are stored locally in the timeout queue 350, pending results from the malware detection system 340. Suspicious messages will be quarantined in jail queue 352. When mail is received, the received mail is cloned. A copy of the message is sent for decomposition and analysis. The original message is left in-tact, but the message policy engine 320 signals the MTA-Scan iterative delivery module 316 to take an MTA quarantine action to the timeout queue 350. The malware detection system 340 signals the release/hold/deletion of the message from the timeout queue 350. After analysis is complete, the malware detection system 340 signals the staging server 300 on how to process the stored message. However, the IPS mode cannot be used when message cloning occurs upstream from the staging server 300.

A store local mode is provided to accommodate when the malware detection system 340 requests the staging server 300 not to send email to the decomposition server 330, but to instead keep a local copy in the timeout queue 350 for future delivery. In this scenario, all mail is immediately stored to the timeout queue 350, and not delivered to the decomposition server 330 until the mode is changed.

The IDS-Inline mode is where all messages are sent from the existing mail environment of the customer to the staging server 300, and where the staging server 300 clones the message. The IDS-inline mode is used during various failure scenarios as detailed below. When mail is received, the received mail is cloned by the message policy engine 320. The original message is immediately routed onward when the MTA-Deliver Interactive Delivery module 360 provides the original message in the outbound queue 362. The outbound queue 362 forwards the original message to the recipient. Message policy engine 364 is used to control delivery of messages from the outbound queue 362 and the MTA-Deliver Interactive Delivery module 360. The cloned copy is relayed to the decomposition server 330 for decomposition. Here, queue and host information are added as X-headers. The cloned message has its envelope information wrapped as X-headers. The envelope from information and the envelope recipient information are changed in order to prevent data leakage from the decomposition server 330 and the malware detection system 340.

The IDS-Cloned mode is the mode used when message cloning has been performed upstream, i.e., prior to being received by the staging server 200. When mail is received, the received mail is cloned by the message policy engine 320. The original message is discarded. The cloned message has its envelope information wrapped as X-headers. Queue and host information are added as X-headers. However, the envelope from information and the envelope recipient information is changed in order to prevent data leakage from the decomposition server 330 and the malware detection system 340. A copy of each message is sent from the institutional mail environment 310 to the staging servers. These messages are relayed to the malware detection system environment 370 for decomposition and analysis.

When the malware detection system is "OFF_Failed_Open", the staging server 300 simply relays messages onwards to the institutional mail servers 310. Messages are not sent onwards for decomposition by the decomposition server 330. No cloning of received messages occurs. When the malware detection system is "OFF", the staging server simply temp-fails the messages to the sending MTA. Messages are not sent onwards for decomposition and no cloning occurs. The hybrid inline mode is like the IPS mode, wherein the hybrid inline mode is used internally by the malware detection system for processing the heartbeat message.

Monitoring is intended to identify and deal with the following failure modes: failure-decomposition server 330, degraded-decomposition server 330, failure-malware detection system 340, system-degraded-timeout and failure-staging. Failure-decomposition occurs when all decomposition servers 330 down. Degraded-decomposition is when one or more, but not all, decomposition servers 3300 are down. Failure-malware detection system occurs when the malware detection system 340 is not sending $C^2$ messages. System-degraded-timeout occurs in IPS mode when the timeout threshold is being breached. Failure-staging occurs when the storage system of the staging server 300 is full or MM Stuck (SLUG injection into MTA SCAN) will be used to test the health of the staging message policy engine 320.

A monitor process runs as a daemon and performs a monitor pass every predetermined period, e.g., a predetermined number of seconds (MONITOR_FREQUENCY). For each pass, the process checks for failure states. For each failure state, a time based delay will be observed prior to changing the state back to the default.

Referring to FIG. 4, failure-decomposition state and the degraded-decomposition state are checked by using a short message, which is also referred to as a slug. The slug is sent through each of the decomposition servers 400 in a messaging system. Test will be performed on both of the MTAs on each decomposition server 400 individually. This verifies that each decomposition server 400 is operational, and that message delivery completes all the way to final decomposition on NFS storage 460. The short message will have a fixed sender, fixed subject line, and fixed recipient. Decomposition server 400 will extract these to a different path on the NFS server 460 to avoid processing by the malware detection system (340 in FIG. 3). When decomposed, the file on disk will be overwritten to prevent the disk from being filled up. The way the short message is written will be a temporary write to a temp file, then a move to the actual file. This catches the scenario where the file system is completely full. A second check will identify the oldest message in decomposition queue to ensure delivery is prompt.

Referring to FIG. 3, recent C2 activity is monitored to check for failure-malware detection system 340. To check for System-degraded-timeout, messages queued in the timeout queue 350 are checked for their ages. Note: F=will allow delivery to the timeout queue 350 even if the message policy engine 320 is jacked; F=T will not allow delivery to the timeout queue 350 if message policy engine 320 is jacked. The customer requirements may be used to configure the system timeout. Failure-staging is checked by analyzing the available disk space. The message policy engine 320 is checked to identify if it is stuck, i.e., not running. Slug injection is provided to MTA "SCAN" module 316 on the staging server 300.

When an issue is detected, an action will be taken and an alert will be sent. In this context, an alert means sending a message to syslog every time, using specifically formatted message starting with MALWARE DETECTION SYSTEM_ALERT, sending a message by email on a configurable basis, wherein the subject line begin with MALWARE DETECTION SYSTEM_ALERT. When an issue is resolved, the original delivery mode will be restored and an "all-clear" message is sent. A message may be sent to the syslog starting with MALWARE DETECTION SYSTEM_ALERT_CLEARED or sent by email with the subject line beginning with MALWARE DETECTION SYSTEM_ALERT_CLEARED.

For decomposition checks, several scenarios are possible. For failure-decomposition, if the system is in MODE=IPS, and if oldest message in the decomposition queue 332 is greater than a predetermined number of minutes, e.g., DECOMP_QUEUE_TIME_THRESHOLD minutes, and if the monitor daemon cannot send a short message to any of the decomposition servers 330, then the process is routed to the IDS-INLINE mode, sets FAIL_CAUSE=DECOMP, and sends an alert. If in MODE=IDS-INLINE, no action is necessary because messages are automatically queued to the decomposition queue 332. For degraded-decomposition, if the decomposition server 330 is in any mode other than OFF, and if the short message cannot be sent to one or more decomposition servers 330, an alert is sent. For decomposition OK, if the decomposition server 330 is currently in FAIL_CAUSE=DECOMPOSITION and short messages can now be sent, the system returns to the DEFAULT_MODE, clears FAIL_CAUSE, and sends an all-clear message.

Several scenarios are also possible for checks of the malware detection system 340. For failure of the malware detection system 340, if in MODE=IPS and there are no $C^2$ activities in a predetermined time, then the process goes to IDS inline mode, sets fail cause=malware detection system 340, and sends an alert. An automated $C^2$ heartbeat ping that is sent from the malware detection system 340 should be scheduled to occur more frequently than the setting of the activity time threshold of the malware detection system 340. The heartbeat uses the $C^2$ channel for purposes of notifying the monitoring process of the staging server 300 that the malware detection system 340 is working normally. For malware detection system OK, if the server is currently in fail cause=malware detection system, and $C^2$ activity is recent go back to default mode, clear fail cause, and send an all-clear message.

For system degraded timeouts (IPS mode only), MESSAGE TIMEOUT REACHED is triggered, and if a message is in the timeout queue 350, and its time in the timeout queue 350 is greater than the IPS_TIMEOUT, the message is released to the outbound queue 362. Message queue identifier (QID) and release time are sent to a released-message log. An alert is then sent. The mode does not need to be changed; mode changes need manual interaction or automated action triggered from the malware detection system 340.

For Failure staging, there are also several scenarios. For Failure-staging—FAIL OPEN, the fail open is handled by the monitor process. In Fail Open, mail continues to route without delay. If the available space on the disk 390 is less than the minimum free disk space available, then set the cause of the failure to DISK_SPACE, go to the OFF_Failed_Open mode, and send a notification. Failure-staging—FAIL CLOSED is automatically handled by the MIN_FREE_BLOCKS feature of the MTA. Disk 390 may provide message storage and/or may provide memory for the queues of the staging server 300.

In Fail Closed, the mail is temporarily failed by the staging server 300, thereby causing the upstream mail server to re-attempt delivery at a later time. If fail-closed behavior is desired, the minimum free space threshold for the disk 390 may be set to a smaller value than the MTA minimum free blocks threshold. The minimum free blocks value is the minimum number of free blocks on the queue file system for accepting SMTP mail. When incoming messages would cause insufficient space, the message is temporarily failed for later delivery, or for re-queue to an alternate staging server. If the available space on the disk 390 is less than the minimum free space of the disk 390, then the cause of the failure is set to DISK_SPACE, the process is directed to the OFF_Failed_Closed mode, and a notification is sent. For staging OK, if the available disk space is greater than the minimum free disk space plus 100 Mb, and if the cause of failure is DISK_SPACE, the process is directed to return to the default MODE, clear the cause of failure and send an all clear message. For failure-staging—FAIL CLOSED, if the MM is the fail cause, then the staging server will reconfigure itself to fail-closed.

The $C^2$ for malware detection system is SSH, wherein SSH will utilize keys in order to authenticate the malware detection system 340. SSH may be used and optimized to minimize connection overhead. A REST based web service that is fully compatible with the SSH communications channel may also be provided. The REST based web service accepts GET/POST requests over SSL. The response contains the exit code in the header of the message along with an XML based response containing the details of the execution.

For each command, an indication of the overall exit status is located in: 1) command line return, 2) webservice header, and 3) embedded in the XML return for both, and is always 0 or 1 (ok or error respectively). Embedded into the XML response of each return is the individual return code for each queue ID for which the respective command received.

Commands are supported on hardware and via remote SSH connections for managing queued messages, controlling/querying the monitor process, and for performing status checks. For any of the command messages (release, hold, redirect, delete), an error code, e.g., 1, for a specific queue ID will be for repeatable or "temp fail" errors. Another error code, e.g., 99, will be used for general errors that do not fall into any of the existing error types.

The staging server may also include a feature for skipping the malware detection system processing. This feature examines message headers for a specific X-malware detection system header such that the malware detection system will not process the messages downstream. An example use case is when the malware detection system 340 is put in-line with pre-spam filters. In addition, each message may be tagged with the time received and an identification of the current mode.

Figure 5:
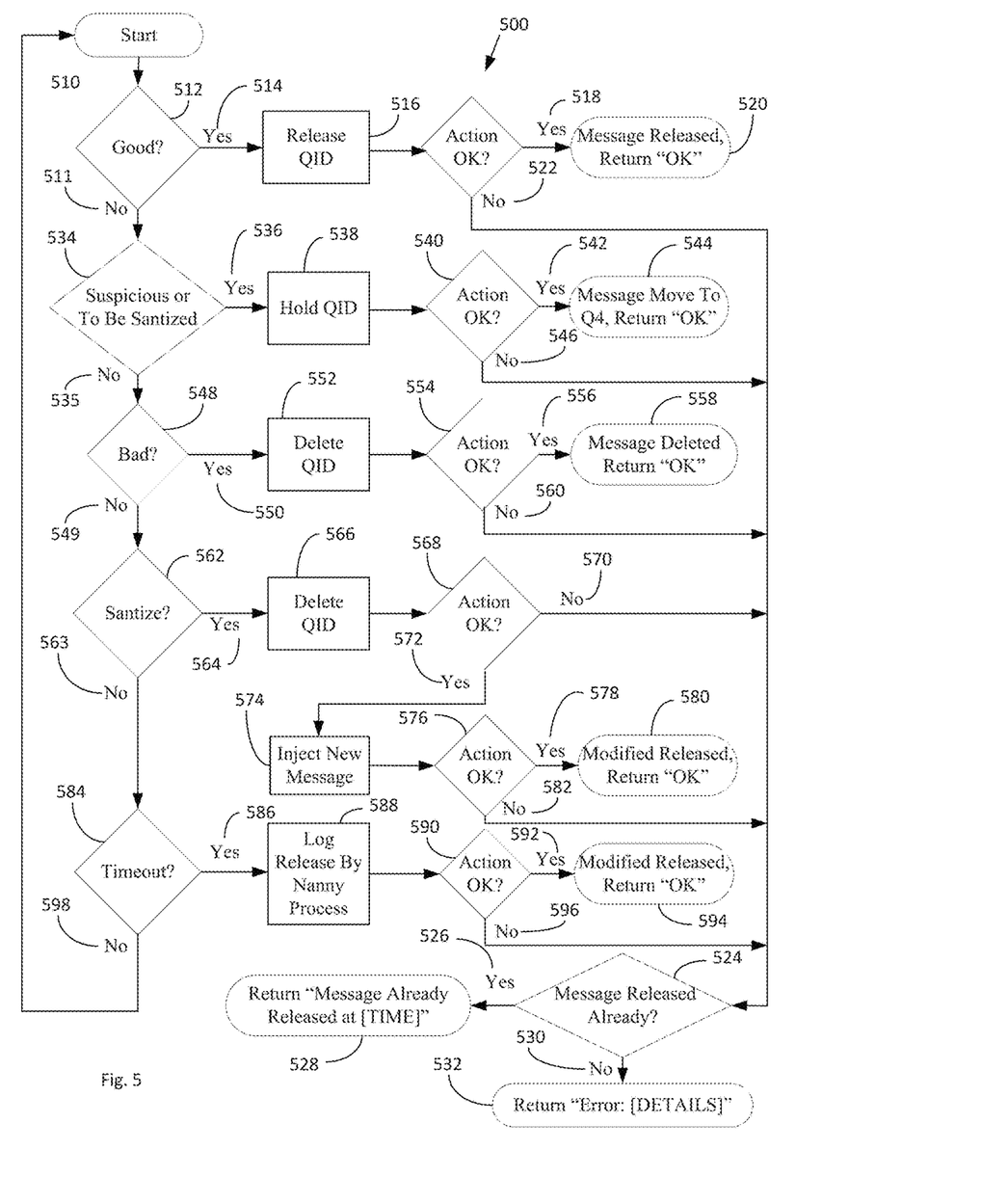
FIG. 5 illustrates a flowchart of a method for providing intrusion prevention system (IPS) mode for a malware detection system according to an embodiment.

FIG. 5 illustrates a flowchart 500 of a method for providing intrusion prevention system (IPS) mode for a malware detection system according to an embodiment. In FIG. 5, a determination is made whether a received message is good 510. If yes 512, the queue identifier (QID) is released 514. A determination is made whether the action is acceptable 516. If yes 518, the message is released and "OK" is returned 520. If not 522, a determination is made whether the message has been released already 524. If yes 526, a "Message Already Released at [TIME]" indication is returned 528. If not 530, an "Error: [DETAILS]" is returned 532. If the message is determined to not be good 511, a determination is made wither the message is suspicious 534. If yes 536, a hold queue identifier is provided 538. A determination is then made whether the action was acceptable 540. If yes 542, a message move to Q4 is provided and "OK" is returned 544. If not 546, the process returns to make a determination whether the message has been released already 524.

If the message is deemed not to be suspicious 535, a determination is made whether the message is bad 548. If yes 550, the queue identifier (QID) is deleted 552. A determination is made whether the action is acceptable 554. If yes 556, the message is deleted and "OK" is returned 558. If not 560, the process returns to make the determination whether the message has been released already 524.

If the message is determined not to be bad 549, a determination is made whether to sanitize the message 562. If yes 564, the queue identifier (QID) is deleted 566. A determination is made whether the action is acceptable 568. If not 570, the process returns to make the determination whether the message has been released already 524. If yes 572, a new message is injected 574. A determination is made whether the action is acceptable 576. If yes 578, the message is modified and released and "OK" is returned 580. If not 582, the process returns to make the determination whether the message has been released already 524.

If the message is determined to not be sanitized 563, a determination is made whether a timeout has occurred 584. If yes 586, a nanny process logs the release information 588. A determination is made whether the action is acceptable 590. If yes 592, the message is modified and released and "OK" is returned 594. If not 596, the process returns to make the determination whether the message has been released already 524. If it is determined that a timeout has not occurred 598, the process returns to the start.

Figure 6:
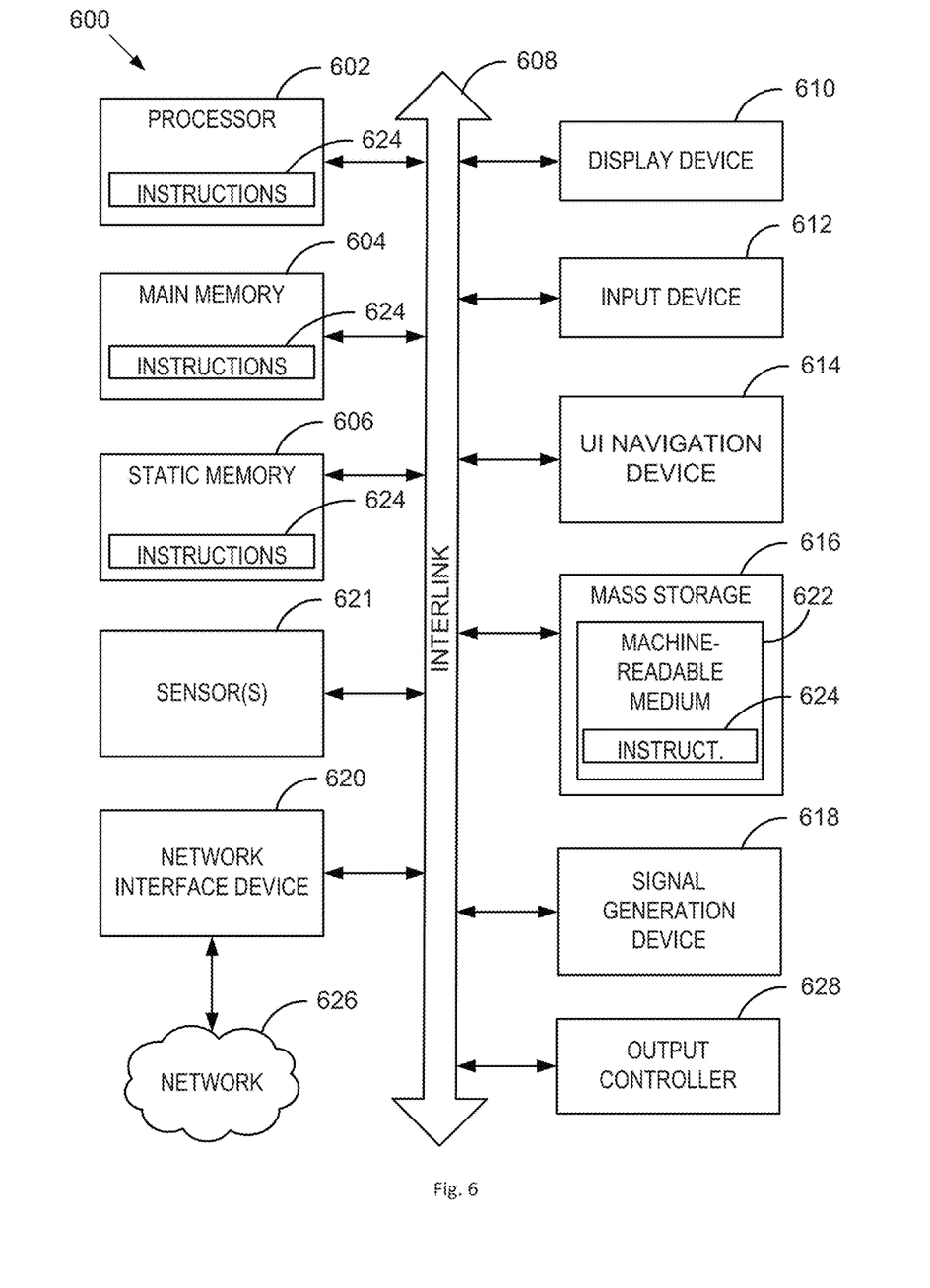
FIG. 6 illustrates a block diagram of an example machine for providing intrusion prevention system (IPS) mode for a malware detection system according to an embodiment upon which any one or more of the techniques (e.g., methodologies) discussed herein may perform.

FIG. 6 illustrates a block diagram of an example machine 600 for providing intrusion prevention system (IPS) mode for a malware detection system according to an embodiment upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 611 (e.g., a mouse). In an example, the display unit 610, input device 617 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 may include at least one machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) that configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (Wi-Fi®), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The behavior of the devices when running certain computation intensive workload is improved. Execution based on run time dynamics, such as network condition, available server resources, etc. is intelligently distributed. Mobile devices gather run-time information and user preference to make intelligent decision on the computing distribution. Multiple aspects of impacting factors are processed and optimal decision for performance, energy and cost are made collectively. Thus, the energy, performance and user experience is also significantly improved.

The above detailed description includes references to the accompanying drawings, which form a part of the detailed description. The drawings show, by way of illustration, specific embodiments may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments may be determined with reference to the appended claims, along with the full scope of equivalents to which such claims are entitled.

What is claimed is:

1. An electronic message staging server, comprising
   a hardware processor comprising processing circuitry configured to implement a plurality of modules, the plurality of modules for processing a received electronic message, a module of the plurality of modules to clone the received message to create a copy of the electronic message;
   a memory to implement a plurality of queues, coupled to the processor, wherein the plurality of queues are used by the plurality of modules to manage process flow of the electronic message, and hold the received electronic message until an analysis of the copy of the electronic message has been completed or until a timeout threshold has been exceeded;
   a message policy engine coupled to the processor, the message policy engine for modifying the copy of the received electronic message by adding queue information and host information as an X-header to the copy of the electronic message, wrapping the envelope from information and the envelope recipient information as an X-header, and changing envelope from information and envelope recipient information of the received electronic message, the queue information indicating which queue of the plurality of queues the electronic message is stored in.

2. The electronic message staging server of claim 1, wherein the plurality of queues includes an incoming queue for initially storing the received electronic messages.

3. The electronic message staging server of claim 1, wherein the plurality of queues includes a timeout queue for holding the received message after cloning the copy of the electronic message and until results of the analysis of the copy of the electronic message is returned.

4. The electronic message staging server of claim 1, wherein the plurality of queues includes a jail queue for quarantining the received message when the analysis deems the copy of the electronic message to be suspicious.

5. The electronic message staging server of claim 1, wherein the plurality of queues includes a decomposition queue for holding the copy of the electronic message prior to decomposition and analysis.

6. The electronic message staging server of claim 1, wherein the plurality of queues includes an outgoing queue for holding the received electronic message released for forwarding to a recipient of the received electronic message.

7. The electronic message staging server of claim 1, wherein the analysis of the copy of the electronic message determines whether the copy of the electronic message or an attachment associated with the copy of the electronic message exhibits suspicious behavior related with a failure state.

8. The electronic message staging server of claim 1, wherein command and control management messages are received for directing an operational mode for processing the received electronic message.

9. The electronic message staging server of claim 1, wherein the message policy engine is further for signaling for quarantining of the received electronic message at a timeout queue and for processing the copy of the received electronic message before forwarding for decomposition and analysis.

10. A decomposition server, comprising:
    a hardware processor comprising processing circuitry configured to implement a module to clone a received message to create a copy of the electronic message;
    a memory to implement an inbound queue for holding the copy of the electronic message for processing until an analysis of the analysis of the copy of the electronic message has been completed or until a timeout threshold has been exceeded; and
    a message policy engine for modifying the copy of the received electronic message by adding queue information and host information as an X-header to the copy of the electronic message, wrapping the envelope from information and the envelope recipient information as an X-header, and changing envelope from information and envelope recipient information of the received electronic message, the queue information indicating which queue of the plurality of queues the electronic message is stored in, and the message policy engine for processing the copy of the electronic message to decompose the copy of the electronic message into pieces, the message policy engine for analyzing and detecting malware associated with the copy of the electronic message or an attachment associated with the copy of the electronic message.

11. A system for providing intrusion prevention arising from electronic messages, comprising:
at least one staging server implemented by processing circuitry of a hardware processor, the staging server for intercepting an incoming electronic message, making a copy of the intercepted incoming electronic message, and holding the intercepted incoming electronic message in a queue of the staging server until an analysis of the copy of the intercepted incoming electronic message has been completed or until a timeout threshold has been exceeded; and
a malware detection system implemented by the hardware processor, the malware detection system coupled to the at least one staging server, the at least one malware detection system including at least one decomposition server for receiving the copy of the intercepted incoming electronic message and processing the copy of the intercepted incoming electronic message to detect malware, the malware detection system including a message policy engine for modifying the copy of the received electronic message by adding queue information and host information as an X-header to the copy of the electronic message, wrapping the envelope from information and the envelope recipient information as an X-header, and changing envelope from information and envelope recipient information of the received electronic message, the queue information indicating the queue of the staging server the incoming electronic message is stored in.

12. The system for processing electronic messages of claim 11, wherein the at least one staging server and the at least one decomposition server are configured in an N-to-M layout, wherein the at least one staging server comprises N staging servers and the at least one decomposition server comprises M decomposition servers and the N staging servers communicate with the M decomposition servers.

13. The system for processing electronic messages of claim 11, wherein the at least one staging server consists of one staging server and the at least one decomposition server consists of one decomposition server, the one staging server and the one decomposition server are configured in a one-to-one staging server-to-decomposition server layout, wherein one staging server communicates only with one decomposition server.

14. The system for processing electronic messages of claim 11, wherein the at least one staging server operates in an intrusion prevention system mode wherein received electronic messages are stored locally until results of an analysis is returned from the malware detection system, the malware detection system performs decomposition and analysis of the copy of the received electronic message, the message policy engine signals the at least one staging server to quarantine the received electronic message at a timeout queue and the malware detection system signals the release, hold or deletion of the received electronic message from the timeout queue.

15. The system for processing electronic messages of claim 11, wherein the at least one staging server operates in a store local mode to store the received electronic message when the malware detection system requests the at least one staging server to not send the copy of the received message to the at least one decomposition server.

16. The system for processing electronic messages of claim 11, wherein the at least one staging server operates in an IDS-Inline mode wherein the received electronic message is immediately routed toward the recipient and the copy of the received electronic message is provided to the malware detection system for decomposition and analysis.

17. The system for processing electronic messages of claim 16, wherein the copy of the received electronic message is modified by adding queue and host information as X-headers, by changing envelope from information and envelope recipient information to prevent data leakage from the malware detection system and by wrapping the envelope from information and the envelope recipient information as X-headers.

18. The system for processing electronic messages of claim 11, wherein the at least one staging server operates in an IDS-Cloned mode when cloning of the message has been performed upstream of the at least one staging server, wherein the received message is cloned to create a copy of the received message and the received message is discarded.

19. The system for processing electronic messages of claim 18, wherein the copy of the received electronic message is modified by adding queue and host information as X-headers, by changing envelope from information and envelope recipient information to prevent data leakage from the malware detection system and by wrapping the envelope from information and the envelope recipient information as X-headers.

20. A method for providing intrusion prevention arising from electronic messages, comprising:
intercepting incoming electronic messages at a staging server;
cloning the intercepted incoming electronic message to make a copy of the intercepted incoming electronic message;
holding the intercepted incoming electronic message in a queue until an analysis of the copy of the electronic message has been completed or until a timeout threshold has been exceeded;
adding queue information and host information as an X-header to the copy of the intercepted incoming electronic message;
wrapping envelope from information and envelope recipient information as an X-header of the intercepted incoming electronic message;
changing the envelope from information and the envelope recipient information of the intercepted incoming electronic message;
forwarding the copy of the intercepted incoming electronic message to a decomposition server
decomposing the copy of the intercepted incoming electronic message into pieces at the decomposition server;
analyzing, at the pieces of the decomposed copy of the intercepted incoming electronic message to detect malware associated with the copy of the intercepted incoming electronic message or an attachment associated with the copy of the intercepted incoming electronic message; and
based on the analysis of the pieces of the decomposed copy of the intercepted incoming electronic message, signaling the staging server to release, hold or delete the intercepted incoming electronic message from the queue at the staging server; and
forwarding the intercepted incoming electronic message released from the queue when the copy of the intercepted incoming electronic message is deemed by the analysis not to be suspicious or when a timeout has occurred.

21. The method of claim 20 further comprising holding the intercepted incoming electronic message in the queue when the decomposition server is unable to process the copy of the intercepted incoming electronic message.

22. The method of claim 20 further comprising deleting the intercepted incoming electronic message in the queue when the decomposition server is deemed by the analysis to be suspicious.

23. At least one non-transitory machine readable storage medium comprising instructions that, when executed by the machine, cause the machine to perform operations for providing intrusion prevention arising from electronic messages, the operations comprising:

intercepting incoming electronic messages at a staging server;

cloning the intercepted incoming electronic message to make a copy of the intercepted incoming electronic message;

holding the intercepted incoming electronic message in a queue until an analysis of the copy of the electronic message has been completed or until a timeout threshold has been exceeded;

adding queue information and host information as an X-header to the copy of the intercepted incoming electronic message;

wrapping envelope from information and envelope recipient information as an X-header of the intercepted incoming electronic message;

changing the envelope from information and the envelope recipient information of the intercepted incoming electronic message;

forwarding the copy of the intercepted incoming electronic message to a decomposition server decomposing the copy of the intercepted incoming electronic message into pieces at the decomposition server;

analyzing, at the pieces of the decomposed copy of the intercepted incoming electronic message to detect malware associated with the copy of the intercepted incoming electronic message or an attachment associated with the copy of the intercepted incoming electronic message; and based on the analysis of the pieces of the decomposed copy of the intercepted incoming electronic message, signaling the staging server to release, hold or delete the intercepted incoming electronic message from the queue at the staging server; and forwarding the intercepted incoming electronic message released from the queue when the copy of the intercepted incoming electronic message is deemed by the analysis not to be suspicious or when a timeout has occurred.

24. The at least one machine readable storage medium of claim 23 further comprising holding the intercepted incoming electronic message in the queue when the decomposition server is unable to process the copy of the intercepted incoming electronic message.

25. The at least one machine readable storage medium of claim 23 further comprising deleting the intercepted incoming electronic message in the queue when the decomposition server is deemed by the analysis to be suspicious.

* * * * *

UNITED STATES PATENT AND TRADEMARK OFFICE
CERTIFICATE OF CORRECTION

| | | |
|---|---|---|
| PATENT NO. | : 8,914,882 B2 | Page 1 of 1 |
| APPLICATION NO. | : 13/667943 | |
| DATED | : December 16, 2014 | |
| INVENTOR(S) | : McDougal et al. | |

It is certified that error appears in the above-identified patent and that said Letters Patent is hereby corrected as shown below:

On the title page 2, in column 2, item 56 under "Other Publications", line 2, delete "maiied" and insert --mailed--, therefor In the specification In column 5, line 44, delete "3300" and insert --330--, therefor

In column 6, line 10, delete "C2" and insert --$C^2$--, therefor

In the claims

In column 11, line 61, in Claim 1, after "comprising", insert --:--, therefor

In column 14, line 52, in Claim 20, after "server", insert --;--, therefor

Signed and Sealed this
Fifth Day of April, 2016

Michelle K. Lee
*Director of the United States Patent and Trademark Office*